(12) United States Patent
Runkle et al.

(10) Patent No.: US 9,767,932 B2
(45) Date of Patent: Sep. 19, 2017

(54) SYSTEMS AND METHODS OF REMOTE CONTROL ROD DRIVE DECOUPLING

(71) Applicant: GE-Hitachi Nuclear Energy Americas LLC, Wilmington, NC (US)

(72) Inventors: Gary A. Runkle, Hampstead, NC (US); Kenneth M. Cole, Rocky Point, NC (US); Eli J. Tyson, Charlotte, NC (US); Harold R. Setliff, Wilmington, NC (US); Steven L. Suek, Wilmington, NC (US); Martin R. Swan, Hampstead, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 323 days.

(21) Appl. No.: 14/337,378

(22) Filed: Jul. 22, 2014

(65) Prior Publication Data
US 2016/0027539 A1    Jan. 28, 2016

(51) Int. Cl.
*G21C 19/105* (2006.01)
*G21C 19/10* (2006.01)
*G21C 7/12* (2006.01)
*G21C 19/20* (2006.01)

(52) U.S. Cl.
CPC ............... *G21C 19/10* (2013.01); *G21C 7/12* (2013.01); *G21C 19/105* (2013.01); *G21C 19/207* (2013.01); *Y02E 30/39* (2013.01)

(58) Field of Classification Search
None
See application file for complete search history.

(56) References Cited

U.S. PATENT DOCUMENTS

| | | | | |
|---|---|---|---|---|
| 724,818 A | * | 4/1903 | Crane | B25B 27/023 29/261 |
| 887,103 A | * | 5/1908 | Lane | B25B 5/003 269/156 |
| 1,131,868 A | * | 3/1915 | Ridlon | B25B 27/023 29/261 |
| 1,505,410 A | * | 8/1924 | Nelson | B25B 27/005 29/246 |
| 1,552,616 A | * | 9/1925 | Kister | B25B 27/005 29/246 |
| 1,589,187 A | * | 6/1926 | Livesay | B25B 27/023 29/261 |

(Continued)

*Primary Examiner* — Sean P Burke
(74) *Attorney, Agent, or Firm* — Ryan Alley IP

(57) ABSTRACT

Systems join with a control rod drive and expand or contract to displace elements necessary for decoupling. Joining structures affix to on sides of the control rod drive allow discriminatory jacking by a powered drive also in contact with the control rod drive. A moveable piston tube can be displaced by this jacking with hundreds or thousands of pounds of force with respect to the control rod drive. Probes and other instrumentation and sensors are useable in the systems to accurately measure any of piston tube displacement, temperature, malfunction; drive power status, displacement or speed; and communications status. Manual interaction with the systems are not required during the jacking, and installation and removal of the systems requires no tools or great amount of time or effort. Through remote operation and brief installation, human exposure to radiation about control rod drives is minimized.

19 Claims, 9 Drawing Sheets

(56) References Cited

U.S. PATENT DOCUMENTS

| | | | |
|---|---|---|---|
| 1,715,019 A * | 5/1929 | Von Grimmenstein | B25B 27/005 29/246 |
| 1,893,353 A * | 1/1933 | Bergman | B25B 27/005 29/246 |
| 2,979,358 A * | 4/1961 | Jerkins et al. | G21C 19/10 279/4.06 |
| 2,997,637 A * | 8/1961 | Bowditch | B66D 3/02 226/113 |
| 3,012,811 A * | 12/1961 | Sandrock | G21C 19/10 294/110.1 |
| 3,089,229 A * | 5/1963 | Brodie | B25B 27/023 29/261 |
| 3,938,845 A * | 2/1976 | Fehl | G21C 19/10 294/86.4 |
| 4,897,240 A * | 1/1990 | Sako | G21C 1/322 376/264 |
| 4,941,252 A * | 7/1990 | Haisch | B25B 27/023 29/261 |
| 5,426,680 A | 6/1995 | Willems | |
| 5,465,497 A | 11/1995 | Kowdley et al. | |
| 5,513,229 A | 4/1996 | Willems | |
| 5,524,030 A | 6/1996 | White et al. | |

* cited by examiner

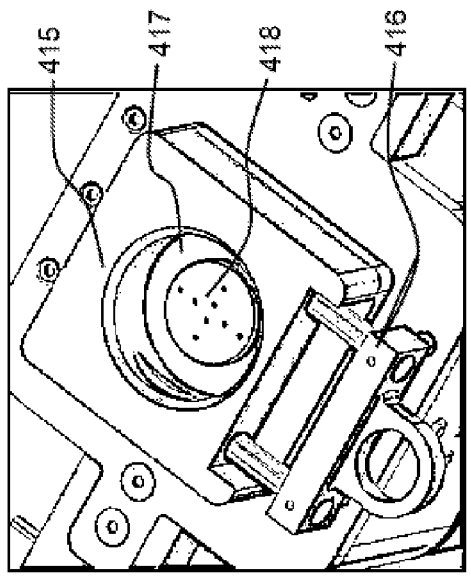
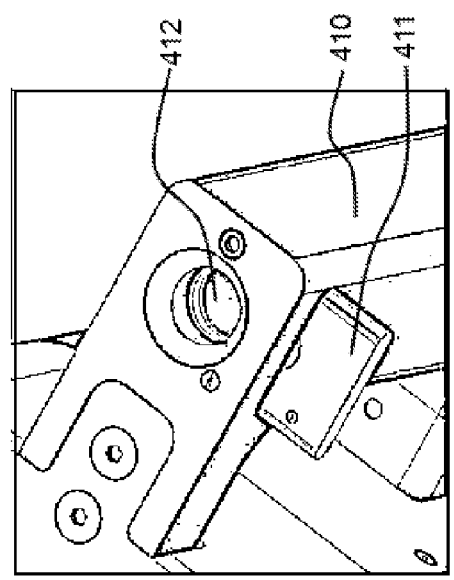
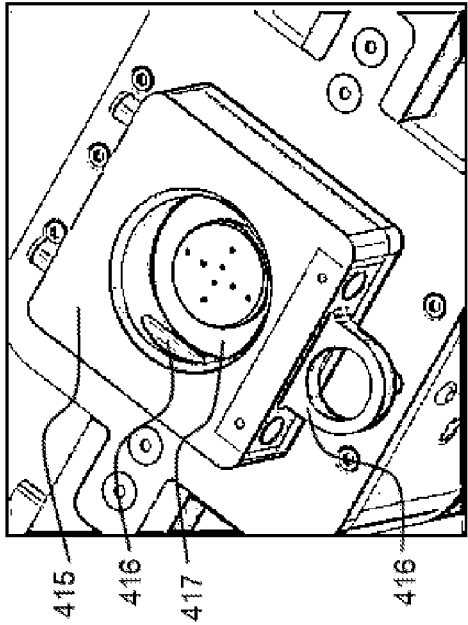
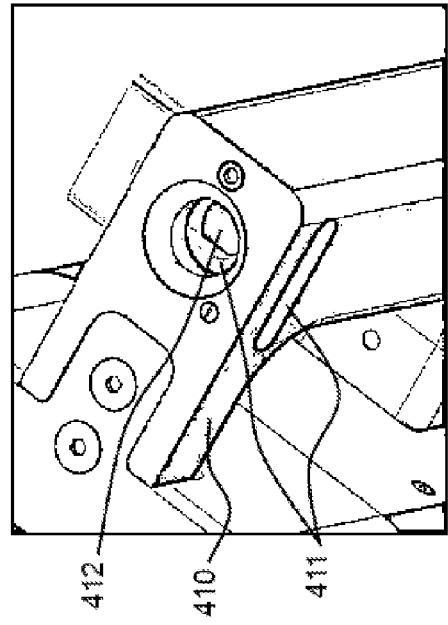

SYSTEMS AND METHODS OF REMOTE CONTROL ROD DRIVE DECOUPLING

BACKGROUND

As shown in FIG. 1, a nuclear power station conventionally includes a reactor pressure vessel 10 with various configurations of fuel and reactor internals for producing nuclear power. For example, vessel 10 may include a core shroud 30 surrounding a nuclear fuel core 35 that houses fuel structures, such as fuel assemblies, 40. A top guide 45 and a fuel support 70 may support each fuel assembly 40. An annular downcomer region 25 may be formed between core shroud 30 and vessel 10, through which fluid coolant and moderator flows into the core lower plenum 55. For example, in US Light Water Reactor types, the fluid may be purified water, while in natural uranium type reactors, the fluid may be purified heavy water. In gas-cooled reactors, the fluid coolant may be a gas such as helium, with moderation provided by other structures. The fluid may flow upward from core lower plenum 55 through core 35. In a water-based reactor, a mixture of water and steam exits nuclear fuel core 35 and enters core upper plenum 60 under shroud head 65. One or more control rod drives 1 may be positioned below vessel 10 and connect to control rod blades or other control elements that extend among fuel assemblies 40 within core 35.

Nuclear reactors are refueled periodically with new fuel to support power operations throughout an operating cycle. During shutdown for refueling, the vessel 10 is cooled, depressurized, and opened by removing upper head 95 at flange 90. With access to the reactor internals, some of fuel bundle assemblies 40 are replaced and/or moved within core 35, and maintenance on other internal structures and external structures like control rod drive (CRD) 1 may be performed from outside of reactor 10.

As shown in FIG. 2, CRD 1 may be mounted vertically within a CRD housing welded to a stub tube 8, which may extend up into reactor pressure vessel 10. A spud 46 at a top of index tube 26 may engage and lock into a socket at the bottom of the control element, and index tube 26 may vertically move through action of the CRD hydraulic system to vertically drive or hold the control element. CRD 1 and any control rod element connected via spud 46 form an integral unit that is manually uncoupled by before CRD 1 or control element may be removed from reactor 10. Below vessel 10, in an access area or drywell, CRD flange 6 may extend downward from vessel 10 and the CRD housing. CRD 1 may be secured to a face by mounting bolts 88 in flange 6. A pressure-tight seal can be created by O-ring gaskets (not shown) between flange 6 and any mounting surface.

One or more CRD hydraulic system lines 81 may pass through ports in flange 6 and work with a CRD hydraulic system for CRD operation, inserting, holding, and/or withdrawing a control element (not shown) via spud 46 at desired positions and speeds for reactor operation. For example, CRD flange 6 may include a withdraw port 82 and an insert port 83 with a check valve 20. Lines 81 may carry water to insert port 83 and from withdraw port 82. Withdraw port 82 may serve as an inlet port for water during control rod withdrawal, via vertical downward movement of spud 46. A piston port 69 may connect to withdraw port 82 in CRD flange 6. Through piston port 69, water and hydraulic pressure may be applied through an under-the-collet-piston annulus to collet piston 29 to cause withdrawal, or downward vertical movement of spud 46. For normal or scram insertion, via vertical upward movement of spud 46, water may be supplied to inlet port 82, and withdrawal port 82 may work as an outlet port for water. For rapid shutdown, such as scram insertion with rapid upward movement of spud 46, check valve 20 may direct external hydraulic pressure or reactor pressure to an underside of drive piston 24.

FIG. 3 is a detail view of a bottom of flange 6, showing an area for insertion of probe 12a. As shown in FIG. 3, piston tube 15 extends upward through the length of CRD 1, terminating in a watertight cap near the upper end of the tube section and, oppositely, at a threaded end secured by a fixed piston tube nut 16 at the lower end of CRD 1. A position indicator probe 12a may be slid into piston tube 15 from the bottom, potentially sealed into indicator tube within the same. External to piston tube 15, probe 12a can be welded to a plate 12b bolted to housing 12 extending from a bottom of flange 6. Housing 12 may be secured to CRD ring flange 17, a downward extension of flange 6, by housing screws 13. In turn, ring flange 17 may be secured to flange 6 by flange screws 9. Probe 12a and housing 12 attached about fixed piston tube nut 16 as a unit, removable from a bottom of flange 6 together through removal of housing screws 13.

Probe 12a transmits electrical signals to provide remote indications of control rod position and CRD operating temperature. Probe 12a can include a switch support with reed switches and a thermocouple for transmitting electrical signals to provide remote indications of control rod position and CRD operating temperature. The reed switches are normally open but may be closed individually during CRD operation by a ring magnet in the bottom of drive piston 24 (FIG. 2). The reed switches are connected by electrical wires to a connection port 14 that may extend outside of housing 12 and provide wired connectivity to remote operators. Housing 12 may protect any electrical wires extending into connection port 14.

In order to uncouple a control element from CRD 1, a lock plug in spud 46 (FIG. 2) may be raised from below by operators working below reactor vessel 10. Conventionally, position indicator probe 12a is removed from CRD 1 prior to drive removal to allow access to piston tube 15 by an uncoupling tool. Operators typically manually attach an uncoupling tool is to a bottom of CRD 1 and apply force, such as with a jack, to raise piston tube 15. When the control element is in its "full-out" position directly atop stub tube 8, drive piston 24 may be separated from a piston head by a small distance. Operators typically observe this positioning directly under vessel 10, and when the positioning is reached, give an indication for removal by other operators. Raising piston tube 15 by this distance lifts the lock plug out of spud 46, allowing spud and piston together to be withdrawn and disengage from a control element.

SUMMARY

Example embodiments include systems that attach to control rod drives and selectively bias the same through a joining structure and a driving jack. The joining structures may fit about an outside of the control rod drive and secure a portion of the jack with the stationary control rod drive exterior. A displacement platform of the jack may then be fitted against a moveable control rod drive structure, like a piston tube that can be displaced in a control element decoupling action. For example, a joining structure may include clamping surfaces that fit about a flange of a control rod drive to secure the jack against the piston tube. The jack can then drive the piston tube with several pounds of force relative to the control rod drive against which the jack expands or contacts. This driving can be achieved via a local force that requires no human interaction. Further, attaching and removing the driving jack to a control rod drive may require no tools, little force, and very little time. This permits control rod drive decoupling actions and procedures to be undertaken with minimal expense and effort, including minimal radiation exposure in areas typically having higher doses directly under a reactor. A probe or other instrumentation, as well as local power connections or supplies and receivers/transmitters allow remote operators to control and monitor the action of example embodiments, progress of any decoupling procedure, and/or malfunctions in control rod drive structures.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

FIGS. 8A and 8B are detailed illustrations of an example embodiment slide lock for a probe to a drive subsystem.

FIGS. 9A and 9B are detailed illustrations of an example embodiment slide lock for an attachment subsystem to a drive subsystem.

DETAILED DESCRIPTION

Figure 1:
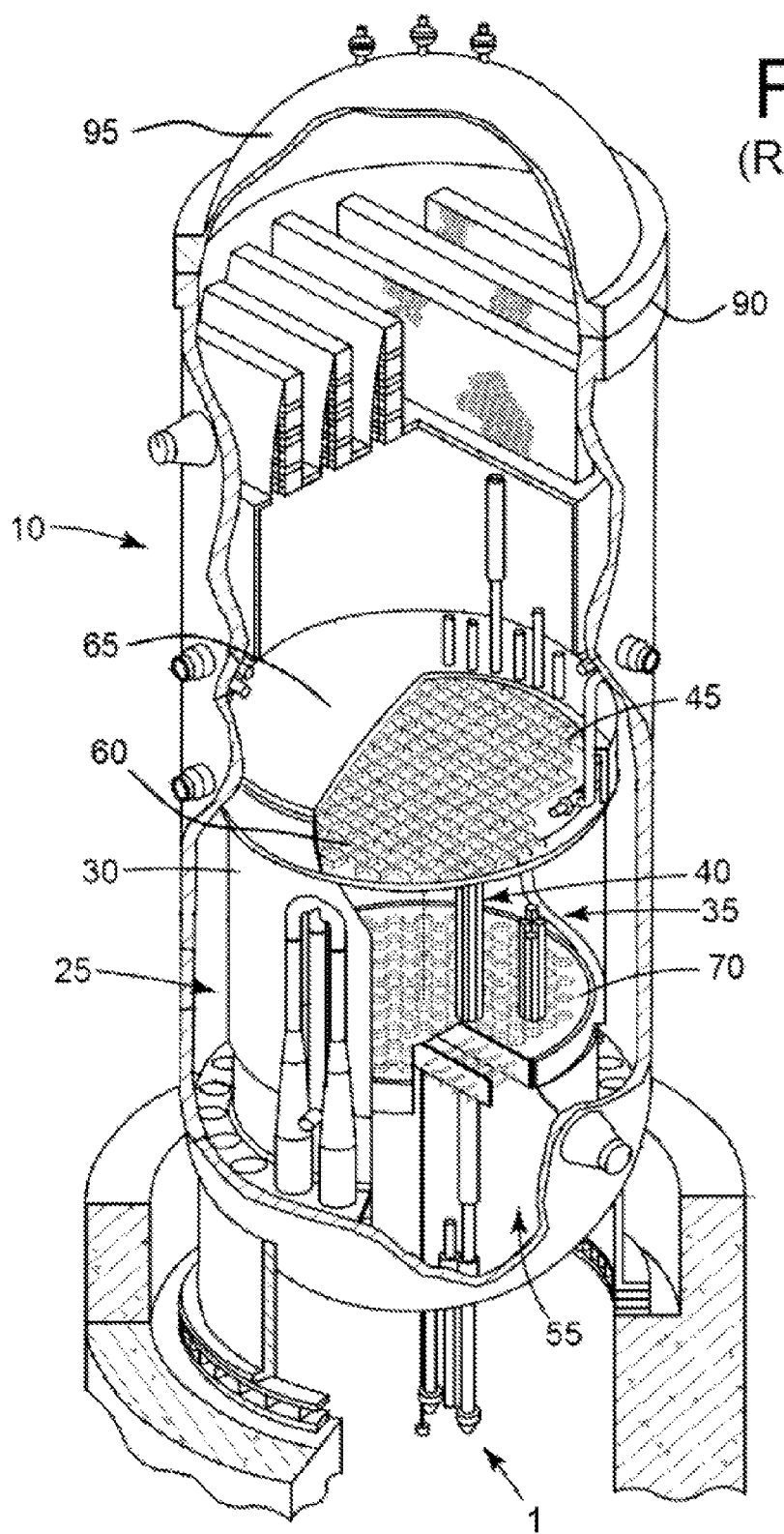
FIG. 1 is an illustration of a related art nuclear power vessel and internals.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized problems in uncoupling tools and procedures. For example, uncoupling tools typically require manual action for long periods of time directly under reactor vessels. Operators must manually jack up each piston tube and measure/hold them in uncoupling positions while control elements are replaced. Further, uncoupling tools typically include a magnet-actuatable switch that reacts to a ring magnet in a drive piston, giving indication (e.g., a single LED illumination) when a piston tube is raised to a sufficient uncoupling distance. Operators typically have to directly observe this indication and manually react with raising/lowering the tube with a jack and other specialized tools to maintain the same. To overcome these newly-recognized problems as well as others, the inventors have developed easily-installed systems and methods for reliable, remote control rod drive (CRD) actuation and monitoring that may reduce operator burden and radiation exposure.

The present invention is systems, methods, and subsystems using remotely-operable drives to move reactor components through expansion or retraction of the drives. In contrast to the present invention, the few example embodiments and example methods discussed below illustrate just a subset of the variety of different configurations that can be used as and/or in connection with the present invention.

Figure 2:
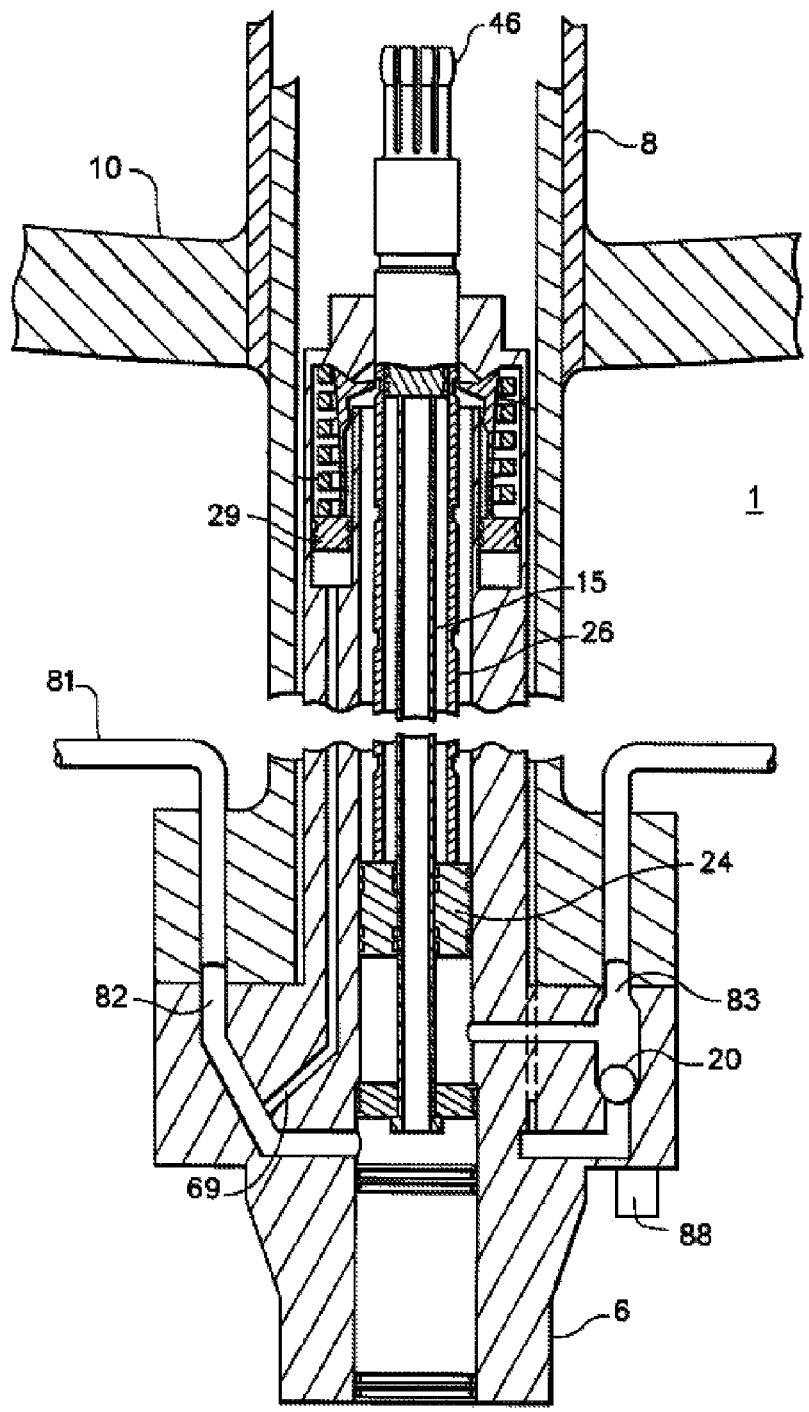
FIG. 2 is an illustration of a related art control rod drive.
Figure 3:
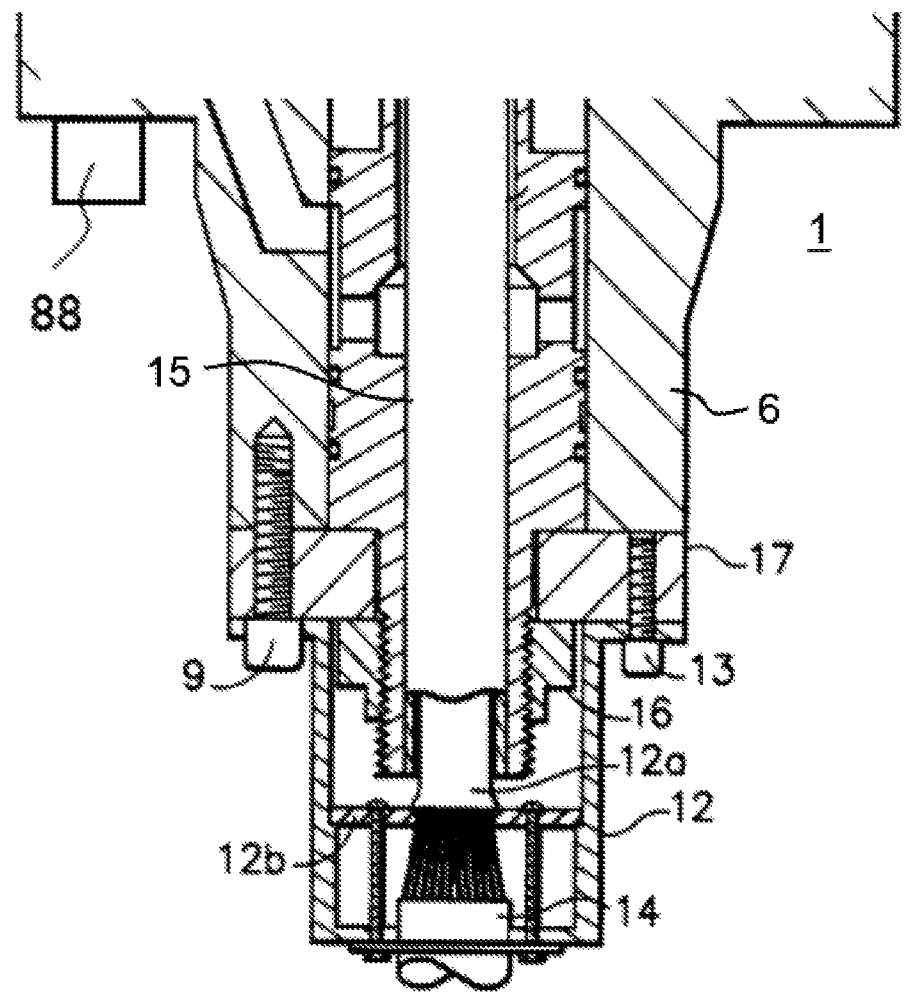
FIG. 3 is a detail illustration of a related art control rod drive.
Figure 4:
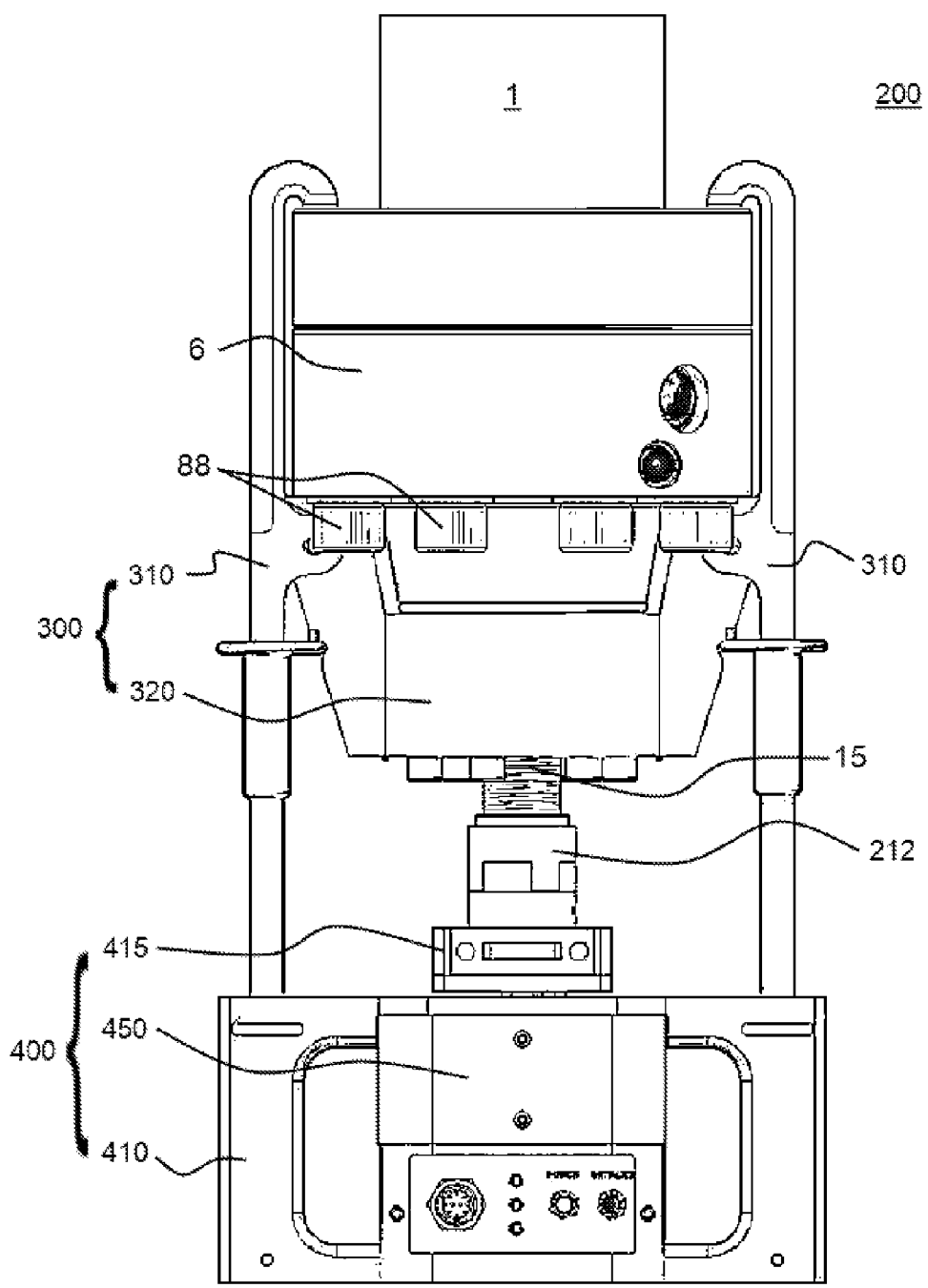
FIG. 4 is an illustration of an example embodiment remote decoupling system.

FIG. 4 is an illustration of an example embodiment remote decoupling system 100 in use with a CRD 1, such as an existing drive in a nuclear power reactor 10 shown and described in FIGS. 1-3. As shown in FIG. 4, example embodiment system 100 may include several subsystems operable together to connect to a lower flange 6 of a CRD 1, typically under reactor 10. For example, system 100 may include an example embodiment attachment subsystem 300, an example embodiment drive subsystem 400, and/or an example embodiment probe 212. While example embodiment subsystems 300 and 400 and probe 212 are useable to attach to and decouple CRD 1, it is understood that other subsystems are useable in example embodiments.

Figure 5:
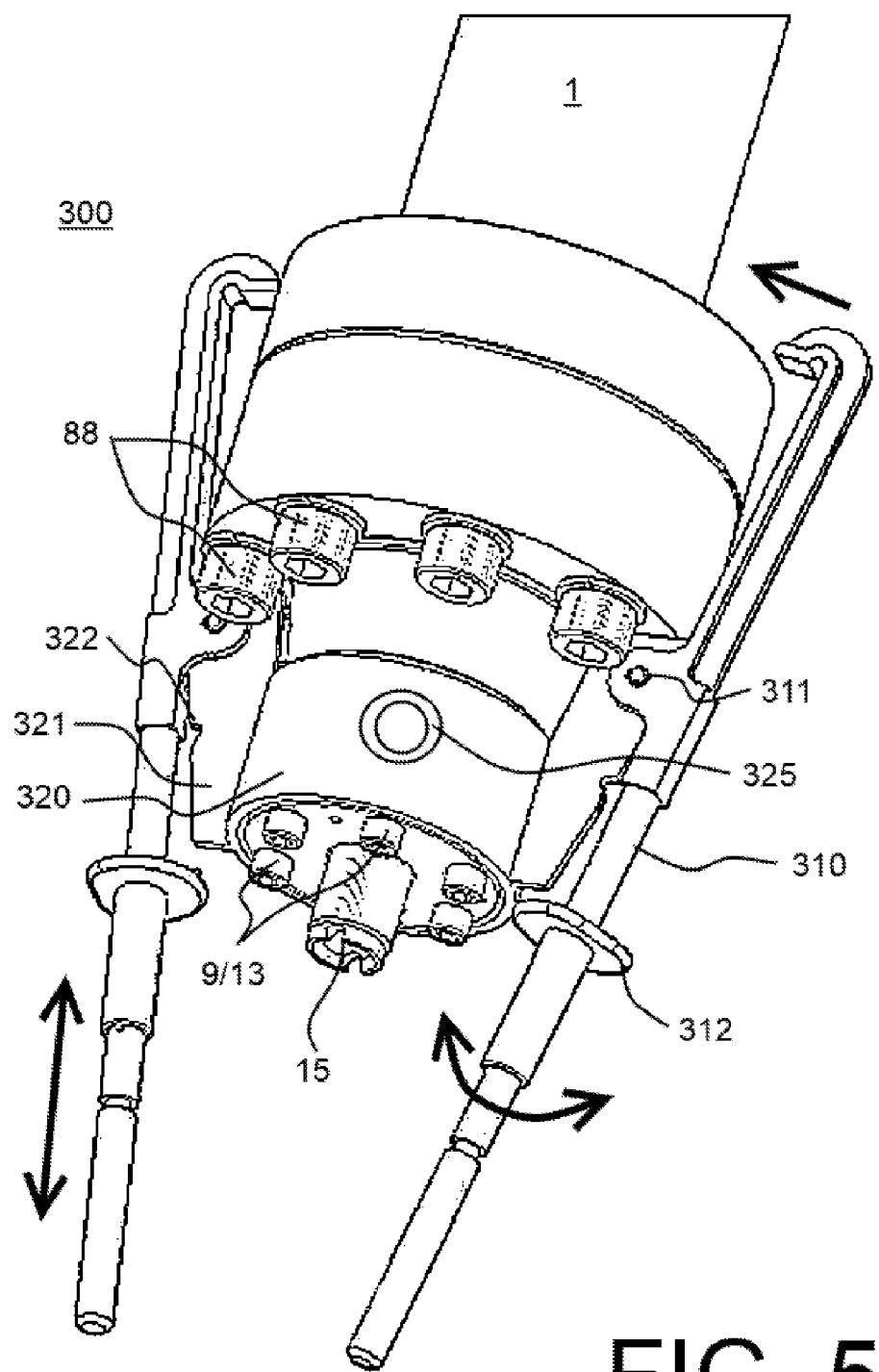
FIG. 5 is an illustration of an example embodiment attachment subsystem.

Attachment subsystem 300 removably secures to CRD 1 via lower flange 6, permitting force to be remotely and selectively directed to CRD tube 15. FIG. 5 is a detail illustration of an example attachment subsystem 300 as it may be installed about a CRD 1. As shown in FIG. 5, attachment subsystem 300 includes at least one clamp arm 310 and a flange sleeve 320. Clamp arm 310 may extend in an axial direction a length sufficient to span a distance from drive subsystem 400 (FIG. 4) to above a lower flange 6 of CRD 1, in order to securely join the two. As seen in FIG. 5, clamp arm 310 may include a U-shaped end, hook, or other clamping structure that can join around flange 6 and/or bias against a back surface of flange 6.

Flange sleeve 320 may be shaped to sit around or over a lower axial end of CRD flange 6, near where bolts 88 and/or screws 9/13 connect terminal pieces to CRD 1. Any terminal housing structures and/or fixed piston tube nut 16 (FIG. 3) may be removed from CRD 1 prior to installation of attachment subsystem 300, such as during an outage or at plant fabrication or decommissioning, to expose piston tube 15. Flange sleeve 320 may include a receptacle 325 for storing fixed piston tube nut 16 during installation and use of example embodiments, to prevent misplacement and allow easy accounting for and reassembly with fixed piston tube nut 16. Flange sleeve 320 may also sit below flange 6, about shoot-out steel, probe 212, or another structure that connects to flange 6 to achieve the same securing as a direct sleeve-flange connection.

With CRD lower flange 6 and piston tube 15 free and accessible, flange sleeve 320 may be seated against lower flange 6 in a vertical or axial direction securely except potentially to permit rotation about a vertical axis for proper aligning. Flange sleeve 320 may include a number of sleeve wings 321 for each clamp arm 310. Clamp arm 310 may be joined to flange sleeve 320 at a hinge 311 on sleeve wing 321 or other connection point that permits movement for removable installation and securing. For example, hinge 311 on sleeve wing 321 may permit clamp arm 311 to rotate about a single axis relative to flange sleeve 320. If sleeve wing 321 is relatively narrow, flange sleeve 320 and clamp arm 310 joined thereto may be rotated together about a length axis of CRD 1 between bolts 88 for desired positioning while avoiding the same.

As shown in FIG. 5, clamp arm 310 may initially be collapsed inward at a free lower end/outward at a clamping end during installation such that clamp arm 310 and flange sleeve 320 seat completely onto and over lower flange 6 of CRD 1 and rotated into position about the same without blocking by clamp arm 310. Then clamp arm 310 may be expanded so as to rotate and seat a U-shaped or clamping end against a back of flange 6, as shown by the terminal inward arrow in FIG. 5.

Clamp arm 310 may include a selective lock that secures attachment subsystem 300 to CRD 1 following installation. For example, as shown in FIG. 5, a rotatable locking edge 312 may be positioned on a telescoping or extendable end of clamp arm 310. Locking edge 312 may include a variable diameter that is shaped at some portions to seat into a locking notch 322 in a corresponding guide ear 321. In this way, after one or more clamp arms 310 are extended over and rotated to seat against flange 6 to secure subsystem 300, locking edges 312 may be extended vertically to locking notches 322 and rotated (in a vertical axis perpendicular to that of hinge 311) into locking notches 322. For example, locking edges 312 may have a varying diameter that allows edges 312 to be moved with arm 310 vertically (long, straight double arrow in FIG. 5) to locking notches 322 without being blocked by guide ear 321 when arm 310 is rotated outward and secured to flange 6. The varying diameter may then be rotated (rotational double arrow in FIG. 5) at notch 322 to engage notch 322 and prevent any further movement of arm 310 except rotation in the vertical axis to "unlock" the edge 312 from notch 322. The resulting installation is shown in FIG. 3, with arms 310 substantially vertical and parallel with CRD 1.

The movements and interrelation of parts of example embodiment attachment subsystem 300 may allow easy and quick installation of attachment subsystem 300 to flange 6 of CRD 1 without any vertical slippage. Subsystem 300 of FIG. 3 may also be easily removed through rotation, then extension, then rotation of clamp arms. This easy and reliable installation and removal may permit minimal personnel effort and work-time about CRD 1 to install and use example embodiments. As such, example embodiments may reduce radiation exposure and increase productivity in control rod operations and maintenance.

Although example embodiment attachment subsystem 300 is shown with two clamp arms 310 that reach around flange 6 to vertically secure to the CRD 1, it is understood that any number of clamp arms 310 and/or other attachment devices, including magnets, adhesives, cables, screw clamps, hydraulics, etc. may be used to attach various systems and subsystems in example embodiments to CRD 1.

Figure 6:
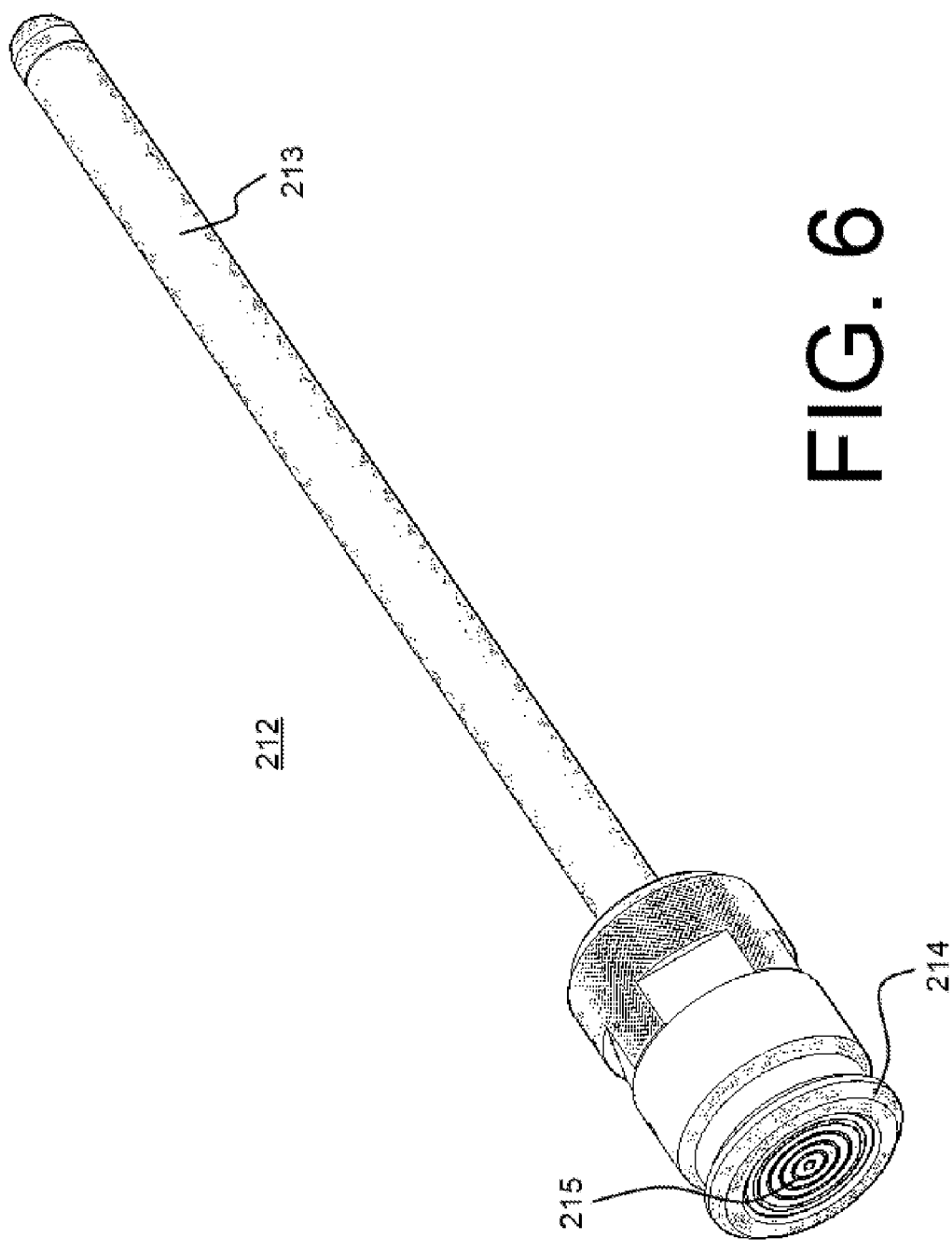
FIG. 6 is an illustration of an example embodiment piston tube probe.

FIG. 6 is an illustration of an example embodiment probe 212 useable in example embodiment system 200. Example embodiment probe 212 is sized and shaped to fit within piston tube 15 (FIG. 4). As shown in FIG. 4, example embodiment probe 212 may be inserted into piston tube 15 before or after installation of attachment subsystem 300 when nut 16 is removed and stored in receptacle 325 or piston tube 15 is otherwise accessible. Probe 212 may include threads or other securing structures that permit a removable joining with piston tube 15, such that a position of probe 212 accurately reflects a vertical displacement of piston tube 15 in CRD 1 during decoupling. Further, any securing structure between probe 212 and piston tube 15 may be sufficiently robust to transfer thousands of pounds of forces in upward and downward vertical directions to piston tube 15 without slippage or breaking in the even probe 212 is the only direct connection to piston tube 15.

As shown in FIG. 6, example embodiment probe may include a stem 213 with electronics, such as Hall effect sensors, magnetostrictive sensors, or magnetic members, that can detect a position of stem 213 and probe 212 in piston tube 15. For example, stem 213 may be lined with sensors that detect ring magnets within a piston or piston tube 15 of a conventional CRD 1 (FIG. 2). Based on magnetic field strength at various vertical positions, probe 212 may determine a degree of insertion and/or extension of piston tube 15, similar to a determination made in conventional CRD decoupling.

Electronics in stem 213 may connect to a probe port 215 in a spring-biased base 214 that extends out of piston tube 15 in example embodiment probe 212. For example, one or more pins or other known communicative interfaces in probe port 215 may transmit signals to other components for proper decoupling measurement. Spring-biased base 241 may connect to other mechanical or communications systems to ensure that example embodiment probe 212 remains seated in piston tube 15 to accurately measure vertical movement of the same decoupling.

As shown in FIG. 4, with probe 212 and attachment subsystem 300 in place and secured to lower flange 6 of CRD 1, example embodiment drive subsystem 400 may be installed to probe 212 and attachment subsystem 300 in order to provide remote communications and movement of piston tube 15 for decoupling.

Figure 7:
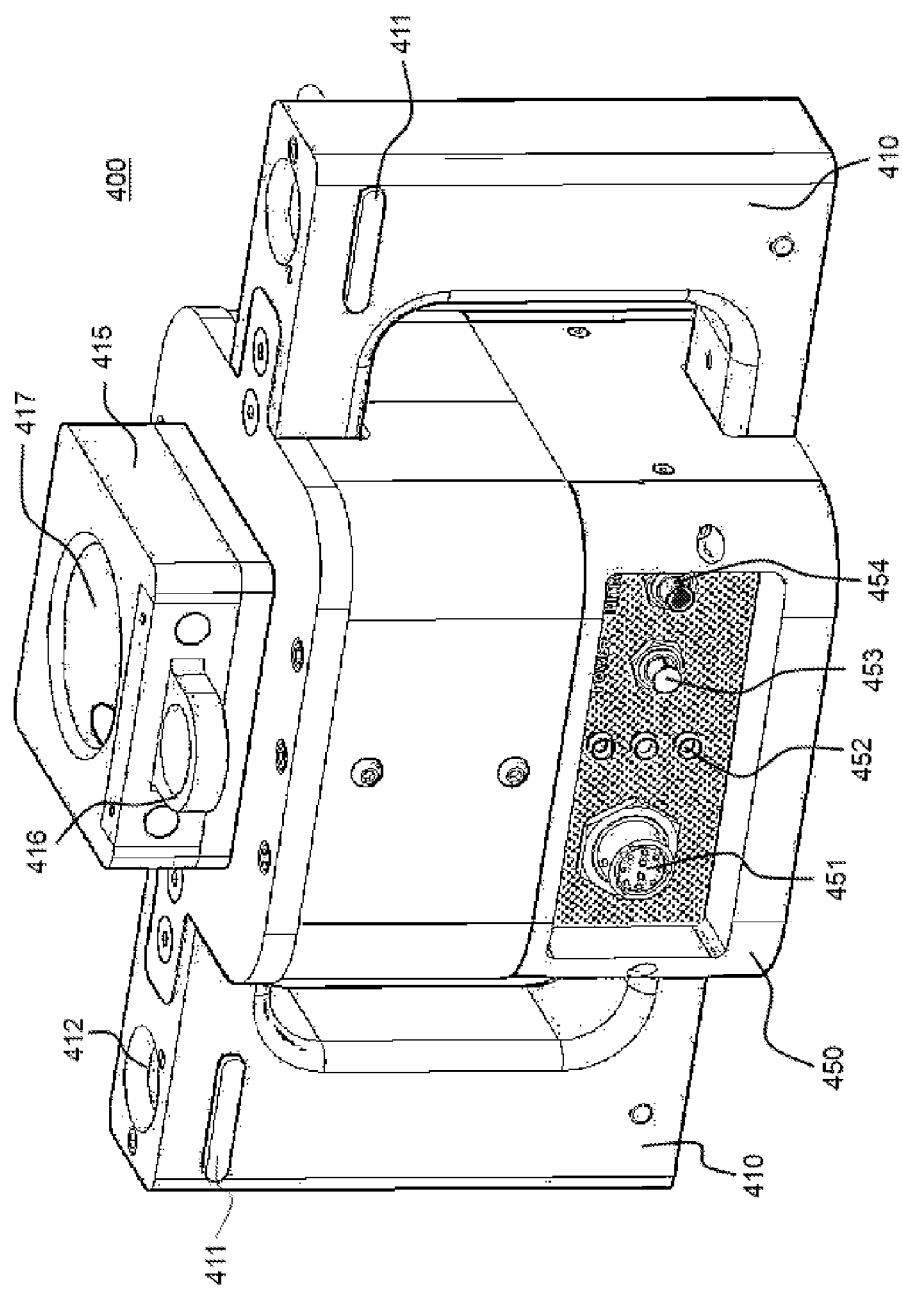
FIG. 7 is an illustration of an example embodiment drive subsystem.

FIG. 7 is a detailed illustration of drive subsystem 400. As shown in FIG. 7, drive subsystem 400 may include a base 450, connection arm 410, and jack platform 415. Each connection arm 410 may match location of a terminal of installed clamp arm 310 from example embodiment attachment subsystem 300, and jack platform 415 may match a location of example embodiment probe 212 and/or piston tube 15 in a CRD. In this way, example embodiment drive subsystem may be useable with other example embodiments. Of course, other dimensioning and configuration of example embodiments is possible to successfully interact with a control rod drive.

Each connection arm 410 may receive or otherwise attach to a terminal end of clamp arm 310 in order to join example embodiment subsystems 300 and 400 and transfer force to piston tube 15. For example, connection arm 410 may define a receptacle 412 into which a corresponding clamp arm 310 (FIG. 5) fits. A locking structure, such as slide lock 411 may permit securing a lower end of clamp arm 310 in receptacle 412.

Similarly, jack platform 415 may receive or otherwise attach to a probe 212, such as via spring-biased face 214 of probe 212 (FIG. 6). For example, jack platform may define a receptacle 417 into which a corresponding probe 212 (FIG. 6) fits. A locking structure, such as slide lock 416 may permit securing a lower end of probe 212 in receptacle 417. Jack platform 415 may also directly attach to piston tube 15 or indirectly attach to piston tube 15 through probe 212; similar connection structures are useable between such elements.

FIGS. 8-9 are details of receptacles 412 and 417 showing examples of simple locking structures in action. As seen in FIGS. 8A and 8B, slide lock 416 may be easily movable in a depth dimension in jack platform 415. Slide lock 416 may define a variable-shaped gap where it intersects receptacle 417, such that an edge of slide lock 416 extends into receptacle 417 when fully seated into jack platform 415. When withdrawn in the depth direction, the variable-shaped edge of slide lock 416 may not extend into receptacle 417. When paired with a notch in probe 212, slide lock 416 may thus secure probe and jack platform 415 together, transferring force between the two and/or piston tube 15, to which probe 212 and/or jack platform 415 may be secured. As shown in FIGS. 8A-B, jack platform 415 may further include a communications interface 418 that receives information from probe 212 and/or provides power and information to probe 212. For example, communications interface 418 may be pin receptacles that uniquely fit pins in probe port 215 on a face of example embodiment probe 212.

As seen in FIGS. 9A and 9B, slide lock 411 may be easily movable in a depth dimension in connection arm 410. Slide lock 411 may define a variable-shaped gap where it intersects receptacle 412, such that an edge of slide lock 411 extends into receptacle 412 when fully seated into connection arm 410. When withdrawn in the depth direction, the variable-shaped edge of slide lock 411 may not extend into receptacle 412. When paired with a notch in clamp arm 310 (FIG. 5), slide lock 411 may thus secure attachment subsystem 300 and connection arm 410 together, ensuring example embodiments and CRD 1 remain in relatively static positions, with the exception of any relative movement of jack platform 415, probe 212, and piston tube 15.

Example embodiment subsystems 300 and 400, as shown in FIGS. 5 and 8-9, may take advantage of relatively simple connection structures that reliably and statically interconnect CRD 1 and example embodiment system 100, while permitting relative movement of jack platform 415 and piston tube 15. These simple connection structures may require no separate tooling; for example, all connection structures in FIGS. 5 and 8-9 may be directly installed and manually operated through pushing, pulling, or twisting the connectors to lock them into place by hand. This relatively simple installation may permit relatively quick and unencumbered installation and securing of example embodiment system 200 with no additional tools required, speeding work time and easing work burden about CRD 1, which may be a higher radiation area.

Returning to FIG. 7, base 450 may include a face with interactive structures for communications and manual interaction. As shown in FIG. 7, a communications and/or power port 451 may allow connection to a wire, pinned interface, or other connector for information transmission from example embodiments during decoupling. For example, port 451 may be interfaced with probe 212 via communications interface 418 and probe port 215, and data and/or operation instructions to/from probe 212 may be transacted through port 451. Port 451 may further receive instructions or operations signals from a remote user for translation into decoupling actions to be taken, including raising or lowering jack platform 415. Port 451 may further accept external power connections to power various parts of example embodiment system 200. Or port 451 may be internal or missing entirely, and communications and operation may be provided through wireless communication over WiFi or other electromagnetic communication. In such an example, base 450 may include a local power source such as a battery to drive operations without external power sources.

Base 450 may further include operations indicators 452 that show a status of example embodiment system 200. For example, operations indicators 452 may include LED lights reflecting power status, initialization routines, successful data connection, errors, etc. A power button 453 may provide manual, local activation capabilities, and an initialization button 454 may provide internal testing and initialization to confirm proper connection with other systems and/or piston tube 15. Of course, indicators 452, and power/initialization button 452/454 may be absent, and such functionality may be provided remotely through wireless communications with a receiver in base 450 or via a cable connected to port 451, for example.

Through relatively simple setup, example embodiment system 200 may be fabricated by installing attachment subsystem 300, inserting probe 212 (if any), and connecting them to drive subsystem 400 through relatively simple and reliable joining mechanisms. Base 450 may then be connected to remote operations and/or operated locally. Removal, such as following decoupling, may be achieved by reversing these actions in example embodiment system 200. As such, total assembly and disassembly may be relatively simple and consume minimal time, and personnel may vacate the area of CRD 1 during the actual uncoupling procedure, which may be achieve through remote operation of example embodiment system 200 discussed below. Although various types of physical and communicative connections and securing structures, as well as different subcomponents have been discussed and interrelated in the above example embodiments, it is understood that other joining mechanisms, communications devices and protocols, and securing structures may be used in example embodiments while still allowing remote decoupling action and monitoring of the same.

In order to perform a decoupling operation on typical CRDs 1, piston tube 15 must be raised by an inch or more using upwards of approximately 1000 pound of force. As such, jack platform 415 raises and lowers vertically relative to base 450 in order to similarly move piston tube 15 to which it may be rigidly joined in the vertical/axial direction. Jack platform 415 may exert large amounts of force through proper gearing and/or induction driving structures in base 450, for example, over the required distance. Such raising and lowering may be performed in the absence of any local personnel action through remote operation of example embodiment system 200.

Figure 10A:
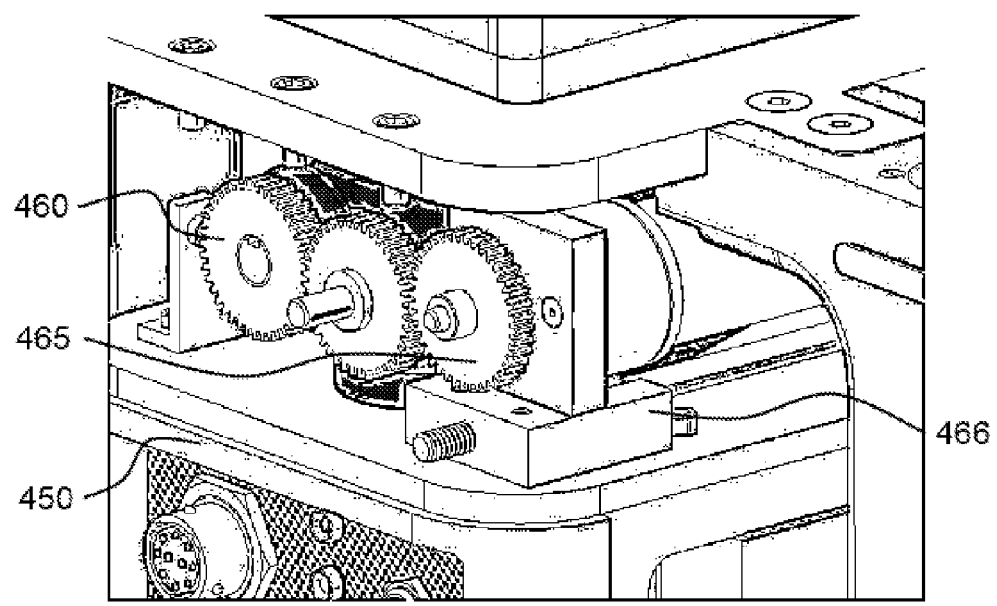
FIGS. 10A and 10B are illustrations of example embodiment motors useable in drive subsystems.
Figure 10B:
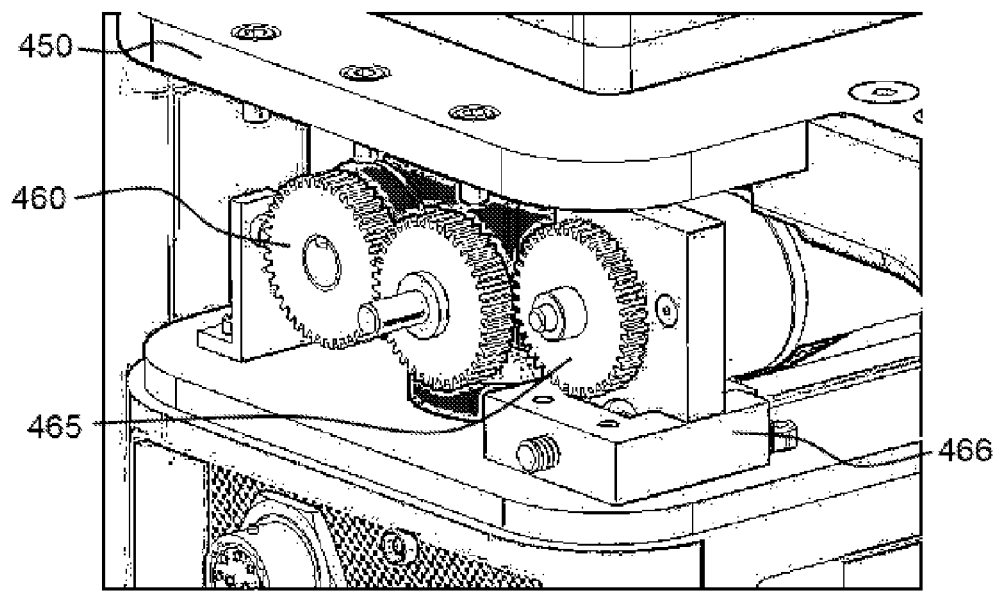

FIGS. 10A and 10B are illustrations of an example embodiment motorized drive in base 450 to provide for raising jack platform 415 (FIG. 4) under sufficient force and distances. As shown in FIG. 10A, a motor 465 may be mounted inside base 450. Motor 465 may be an electric motor powered by a local battery or external power source. Motor 465 may have sufficient wattage or torque, or be connected through sufficient gearing, to create over 1000 pounds of force in jack platform 415 in an upward and downward vertical direction. For example, motor 465 may connect to a worm gear 460 that converts force from motor 465 to controlled vertical movement in a geared piston in jack platform 415 without slippage or reversal/overshoot under action of motor 465. Motor 465 may be actuated remotely, such as through wireless or electrical signal from a user positioned in a control room or offsite, allowing jacking of piston tube 15 remotely.

Motor 465 may be selectively engaged, such as via an engagement assembly 466 that moves motor 465 in a depth direction to engage or disengage with worm gear 460. For example, by driving a screw in engagement assembly 466, a user or automatic function may disengage or engage motor 465 as desired. As shown in FIG. 10B, disengagement of motor 465 by turning a screw in assembly 466 to disconnect gearings of motor 465 and worm gear 460 may allow a user to manually operate work gear 460 in the instance of motor failure or necessary manual intervention. Motor 465 may further include a cycle counter or other sensor that relates its position, torque, and/or velocity to location, force, and/or speed of jack platform 415. Such data may also be communicated to remote users through communications ports or interfaces in example embodiments, such that users may remotely monitor jack platform position, potentially independent of any piston tube sensor magnetic readings, in order to monitor progress and confirm or calibrate other sensors.

As seen in FIG. 4, through connection of various subsystems among example embodiments, a relatively large amount of force may be selectively applied to piston tube 15 in CRD 1 in an upward or downward vertical direction. This force may be controlled by operators stationed remotely, allowing movement of piston tube 15 for decoupling without direct human action or monitoring, thus reducing human radiation exposure and workload. Further, operations of example embodiments, including system status/malfunction, exact location of probe 212 and thus piston tube 15 in CRD 1, height and movement direction of jack platform 415, etc. may be transmitted to remote operators to better inform their actions and other decoupling activities, such as in-core control element movements and removal from any unlocked spud.

Although a selectively-engaged motor 465 may be useable to provide the remotely-actuated force in example embodiments to achieve conscious uncoupling through relative movement, it is understood that any number of different force-creating devices can be used in example embodiments. For example, pneumatic cylinders or direct induction drives can be used to create desired vertical movement of platform 415 remotely.

Example embodiments and methods thus being described, it will be appreciated by one skilled in the art that example embodiments may be varied and substituted through routine experimentation while still falling within the scope of the following claims. For example, a variety of control rod drive designs are compatible with example embodiments and methods simply through proper dimensioning of example embodiments—and fall within the scope of the claims. Such variations are not to be regarded as departure from the scope of these claims.

What is claimed is:

1. A remote decoupling system for use in a nuclear reactor, the system comprising:
    an attachment structure configured to removably secure to a control rod drive of the reactor such that the control rod drive and attachment structure do not move relative to one another in a vertical direction;
    wherein the attachment structure includes,
    a sleeve shaped to fit around a lower flange of the control rod drive, and
    a clamp arm connecting to the sleeve and configured to attach to a backside of the flange; and
    a jack secured to the attachment structure, wherein the jack is configured to displace a piston tube of the control rod drive in the vertical direction relative to the control rod drive and the attachment structure without human contact.

2. The system of claim 1, wherein the jack includes a port configured to mechanical secure to a probe inserted in the piston tube, and to provide electrical communications and electrical power to the probe.

3. The system of claim 1, wherein the clamp arm is rotatable with respect to the sleeve and extendable, and wherein the clamp arm includes a lock that prevents further rotation and extension of the clamp arm.

4. The system of claim 1, wherein the jack includes an electric motor configured to displace the jack and the piston tube with approximately 1000 pounds of force.

5. The system of claim 1, wherein the jack includes a communications port configured to receive signals to control the operation of the jack and transmit information about operation of the jack.

6. The system of claim 1, wherein the attachment structure is removably joined to the jack.

7. The system of claim 6, wherein the attachment structure is removably joined to the jack by structures requiring only human hands to join and remove.

8. The system of claim 7, wherein the structures are locks having variable edges that slide within the jack between positions that capture the attachment structure and positions that do not capture the attachment structure.

9. The system of claim 1, further comprising:
    a battery powering the jack.

10. The system of claim 1, wherein the attachment structure includes,
two clamp arms that each includes a curved end configured to bias against a flange of the control rod drive, wherein each clamp arm includes an extendable and rotatable locking edge having a variable diameter, wherein the locking edge is separated from the curved end,
a cylindrical sleeve configured to fit over a lower portion of the flange while leaving the piston tube at the end of the flange open, wherein the cylindrical sleeve includes two ears opposite each other, and wherein each one of the clamp arms connects to a corresponding one of the ears via a hinge.

11. The system of claim 10, wherein the clamp arm is configured to rotate about the hinge to fit over the flange and secure to the flange, and wherein each ear includes a notch into which the locking edge may be extended and rotated such that the clamp arms cannot be extended or rotated about the hinges when each locking edge is rotated into its corresponding notch.

12. The system of claim 1, further comprising:
a transmitter configured to transmit information from the sensors to a remote operator.

13. The system of claim 12, wherein the jack includes, a motor configured to displace the jack in the vertical direction with a force sufficient to also displace the piston tube attached to the jack in the vertical direction, wherein the transmitter is further configured to transmit information of operation of the motor and the displacement to the remote operator.

14. The system of claim 13, wherein the jack further includes a battery that powers the motor and the transmitter.

15. The system of claim 14, further comprising:
a receiver configured to receive operational signals from the remote operator, and wherein the motor is configured to displace the jack based on the operational signals.

16. The system of claim 1, wherein,
the control rod drive extends from reactor pressure vessel of the nuclear reactor to a flange, wherein the flange is cylindrical and has an upper portion and a lower portion, wherein the upper portion has a larger diameter than the lower portion,
the piston tube extends a length of the control rod drive through a center of the upper portion and the lower portion of the flange, and
the attachment structure includes,
a tubular sleeve shaped to sit on the lower portion of the flange and having a diameter smaller than the upper portion of the flange,
a first sleeve wing including a first hinge and a second sleeve wing including a second hinge,
a first clamp arm joined to the first sleeve wing via the first hinge such that the first clamp arm is rotatable in a single plane with respect to the tubular sleeve, wherein the first clamp arm has a U-shaped end that is rotatable behind the upper portion of the flange when the tubular sleeve is seated on the lower portion of the flange, and
a second clamp arm joined to the second sleeve wing via the second hinge such that the second clamp arm is rotatable in a single plane with respect to the tubular sleeve, wherein the second clamp arm has a U-shaped end that is rotatable behind the upper portion of the flange when the tubular sleeve is seated on the lower portion of the flange.

17. The system of claim 16, wherein,
the first sleeve wing includes a first notch,
the first clamp arm includes a first rotatable and extendable locking edge that rotates into the first notch when the first clamp arm and the second clamp arm are parallel, and
the second clamp arm includes a second rotatable and extendable locking edge that rotates into the second notch when the first clamp arm and the second clamp arm are parallel, wherein the first and the second locking edges being rotated into the first and the second notches prevents all relative movement among the first clamp arm, the second clamp arm, and the tubular sleeve except for further rotation of the first and the second locking edges.

18. The system of claim 17, wherein the jack includes,
a first locking receptacle configured to receive and lock to the first clamp arm when the first clamp arm and the second clamp arm are parallel,
a second locking receptacle configured to receive and lock to the second clamp arm when the first clamp arm and the second clamp arm are parallel, wherein the first and the second clamp arms being locked into the first and the second receptacles prevents all relative movement among the jack and the attachment structure, except for further rotation of the first and the second locking edges.

19. A remote decoupling system for use in a nuclear reactor having a control rod drive extending from the nuclear reactor, the control rod drive having a flange exterior to and separated from the reactor, the control rod drive having a central piston tube extending inside the control rod drive, the system comprising:
an attachment structure including a tubular sleeve and a plurality of clamp arms rotatably joined to the tubular sleeve, wherein the tubular sleeve is shaped seat onto a first side of the flange, wherein the plurality of clamp arms are shaped to clamp to a second side of the flange, wherein the first side and the second side of the flange are opposite of each other, wherein the tubular sleeve being seated and the clamp arms being clamped removably secures the attachment structure to the control rod drive such that the control rod drive and attachment structure do not move relative to one another in a vertical direction; and
a jack configured to secure and lock to the plurality of clamp arms of attachment structure, wherein the jack includes a motor configured to displace the piston tube of the control rod drive in the vertical direction relative to the control rod drive with at least 1000 lbs-force not from human contact.

* * * * *